July 20, 1926.
T. AOKI ET AL
TIME MEASURING APPARATUS
Filed July 30, 1924
1,592,816
Fig. 1
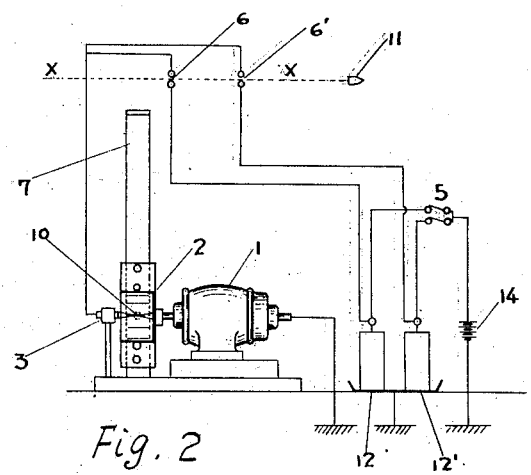
Fig. 2
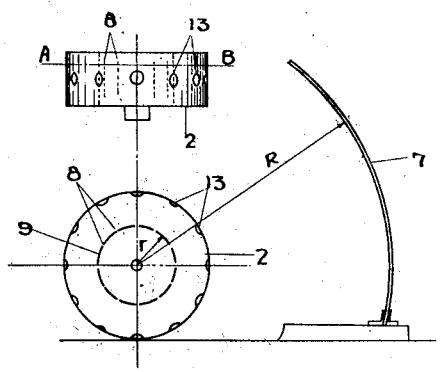
Fig. 3
INVENTORS
Tamotsu Aoki
Masuo Hagiwara
By Richards, Geier
Attys.

Patented July 20, 1926.

1,592,816

UNITED STATES PATENT OFFICE.

TAMOTSU AOKI AND MASUO HAGIWARA, OF TOKYO, JAPAN.

TIME-MEASURING APPARATUS.

Application filed July 30, 1924, Serial No. 729,064, and in Japan February 13, 1924.

This invention relates to improvements in apparatus for accurately measuring very short intervals of time, and has particular reference to an apparatus for measuring the velocity of a projectile etc.

A general method of measuring a very short time is to employ a known standard time with which the time to be measured is compared and these two times, one known and the other to be measured, are recorded in a form of length so that they are easily compared. It is therefore concluded that the accuracy of measurement entirely depends upon the magnitude of lengths recorded by the measuring apparatus.

The object of the invention is to obtain records of very great lengths, or to magnify the lengths at will, so that a time is measured with an accuracy far better than that in the known apparatus.

In the accompanying drawings.

Fig. 1 is a diagrammatical view of the invention applied to the measurement of velocity of a projectile;

Fig. 2 is a detailed plan of a perforated rotating drum and its concentric auxiliary drum employed in this invention; and Fig. 3 is an enlarged sectional view of the main parts of the invention.

Referring to the drawings, 9 is a drum rotating with a known velocity which is therefore employed as a means for giving the standard time in this invention. This drum is provided with holes or slits in its periphery as shown at 8. 10 is a source of light which is arranged on the axial center of the drum. 7 is an arcurate wall or supporter arranged concentric with the rotating drum and having upon its inner surface a film of sensitized paper to record the images of the slits 8 by the source of light 10. In the example shown, the source of light 10 consists in a discharging gap of electric spark.

Now, suppose that the drum 9 stands still and the gap is sparked, then the images of the slits 8 will be formed on the film on the wall 7. When the drum is rotated and the gap is intermittently sparked, an image of a certain slit will be recorded on the film on the wall by the first spark and also another image of the same slit by the second spark will be recorded in a certain circumferential distance from the first image and so on. This circumferential distance corresponds to the time passed between the first and the second sparks. The magnitude of the distance depends, of course, upon the rotating velocity of the drum 8, and the distance between the center of the drum 9 and the wall 7.

Now let
$v$ be the peripheral velocity of the drum 9,
$r$ the radius of the drum 9,
$V$ the velocity of the light beam on the wall 7, and
$R$ the radius of the wall 7,
then $$V = \frac{R}{r} v$$

again let
$s$ be the circumferential distance between the first and the second images, on the wall 7, and
$t$ the corresponding time
then $$S = Vt = \frac{R}{r} vt$$

Therefore any desired magnitude of the length of arc can be obtained by properly selecting the ratio $R:r$, although the value of $v$ will be limited to a certain magnitude by the strength of the material of the drum 9.

In order to distinguish an image of a slit or hole from another, the lengths or the shapes or sides of the slits may be varied. For the same purpose, the holes or slits may be arranged in a zigzag way. Also in order to get clear images on the film a series of sets of lenses 13 corresponding to the number and position of the slits 8, may be used by properly fixing them on another drum 2.

One example of carrying into effect of this invention for measuring the velocity of a projectile is shown by Fig. 1. In this figure, 11 is a projectile, in the path X X of which are arranged two discharge gaps 6, 6' of Leyden jars 12, 12' in parallel and in their common circuit the said discharge gap or the source of light 10 is provided. 1 is a constant speed electric motor, on the rotating shaft of which the drum 9 and the auxiliary drum 2 is fitted. One terminal of discharge gap 10 is supported on the bearing 3 while the other is fixed to the shaft of the motor. 14 is a source of electricity to charge the Leyden jars. 5 is a switch.

In operation, the motor 1 is rotated. The switch 5 is closed to charge the Leyden jars and then again opened. Then the fire arm is fired. When the projectile passes through the first gap 6, the gap 10 is sparked, and similarly when it passes through the second gap 6', the gap 10 is sparked again. Thus, the images of one or more of the slits 8 are twice formed in the film on the wall 7. Let S be the distance of the first and the second images of respective slit along the arc of the wall, then the time $t$ required for the projectile in passing from the first gap 6 to the second gap 6' is obtained by $$t = \frac{S}{V}.$$

Induction coils may be used in place of Leyden jars. In this case, so called wire targets made of easily breakable wires are conveniently used in place of gaps 6 and 6' and the wire of each target is connected with primary coil of the induction coil in one end and to electric batteries in the other. The secondary coil of the induction coil is connected with the terminals of the gap 10. When the projectile breaks the wire targets, the gap 10 is successively sparked.

The experiments by using the above described apparatus may be carried on in a dark chamber. But it is preferably convenient to arrange the parts 2, 7, and 9 in a closed box so that the experiments may be carried on in an open field.

Claims:

1. An apparatus for measuring a short time, including a drum having slits or holes in its periphery, a source of light at the center of said drum, means to rotate said drum at a predetermined velocity, and a fixed arcuate member concentrically arranged with respect to said drum and to which a film of sensitized material is capable of being attached to receive the images of the slits or holes in the periphery of the drum.

2. An apparatus for measuring a short time, according to claim 1, comprising a drum provided with slits or holes of different shapes, sizes, or arranged in zigzag way.

In testimony whereof we affix our signatures.

TAMOTSU AOKI.
MASUO HAGIWARA.